(12) United States Patent
Renner

(10) Patent No.: US 8,511,190 B2
(45) Date of Patent: Aug. 20, 2013

(54) SHIFTING ASSEMBLY FOR SHIFTING THE REVERSE GEAR OF A VARIABLE SPEED GEARWHEEL TRANSMISSION AND VARIABLE SPEED GEARWHEEL TRANSMISSION

(75) Inventor: Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 205 days.

(21) Appl. No.: 13/124,893

(22) PCT Filed: Nov. 16, 2009

(86) PCT No.: PCT/EP2009/065203
§ 371 (c)(1),
(2), (4) Date: Apr. 19, 2011

(87) PCT Pub. No.: WO2010/072466
PCT Pub. Date: Jul. 1, 2010

(65) Prior Publication Data
US 2011/0226076 A1    Sep. 22, 2011

(30) Foreign Application Priority Data
Dec. 15, 2008   (DE) .......................... 10 2008 054 665

(51) Int. Cl.
*F16H 3/38* (2006.01)
(52) U.S. Cl.
USPC ....................................... 74/339; 192/53.331
(58) Field of Classification Search
USPC .................... 74/339; 192/53.3, 53.31, 53.33, 192/53.331
See application file for complete search history.

(56) References Cited

U.S. PATENT DOCUMENTS

| | | | |
|---|---|---|---|
| 3,175,413 A | 3/1965 | Peras | |
| 3,221,851 A | 12/1965 | Vandervoort | |
| 3,364,768 A | 1/1968 | Powell | |
| 4,059,178 A * | 11/1977 | Magg et al. ................ | 192/53.34 |

(Continued)

FOREIGN PATENT DOCUMENTS

| | | |
|---|---|---|
| CN | 87 1 01717 A | 11/1987 |
| DE | 1 098 824 | 2/1961 |

(Continued)

OTHER PUBLICATIONS

Chinese Office Action Mailed Mar. 28, 2013 With Respect to Application No. 200980150273.1 and Accompanying Search Report.

*Primary Examiner* — Ha D Ho
(74) *Attorney, Agent, or Firm* — Davis & Bujold, PLLC

(57) ABSTRACT

A shifting assembly for shifting the reverse gear of a variable-speed gearwheel transmission. The shifting assembly comprises a reverse-gear gearwheel mounted to rotate on a transmission shaft which has a first tooth array. A clutch body, that is rotationally fixed to the transmission shaft which has a second tooth array, is associated with the reverse-gear gearwheel. The first and the second tooth arrays are axially forced into engagement in order to engage the reverse gear. A synchronizer ring, connected to the reverse-gear gearwheel, has a friction surface which engages another mating friction surface during synchronization. The synchronizer ring and the reverse-gear gearwheel can rotate relative to one another by a limited angular amount between a blocking position and a through-connection position. A stressing element, arranged between the synchronizer ring and the reverse-gear gearwheel, pre-stresses the synchronizer ring relative to the reverse-gear gearwheel in the direction of a blocked position.

20 Claims, 5 Drawing Sheets

(56) References Cited

U.S. PATENT DOCUMENTS

| | | | |
|---|---|---|---|
| 4,138,007 | A | 2/1979 | Wakabayashi |
| 4,162,001 | A | 7/1979 | Yant |
| 4,703,667 | A | 11/1987 | Richards |
| 5,161,423 | A * | 11/1992 | Ore ................................. 74/339 |
| 5,607,037 | A | 3/1997 | Yarnell et al. |
| 5,641,044 | A * | 6/1997 | Morscheck ............... 192/53.331 |
| 6,196,944 | B1 | 3/2001 | Schmitz |
| 6,390,266 | B1 * | 5/2002 | Rose et al. ................ 192/53.331 |
| 6,571,927 | B2 * | 6/2003 | Rose et al. ................ 192/53.331 |
| 7,431,137 | B2 * | 10/2008 | Bader ......................... 192/53.32 |

FOREIGN PATENT DOCUMENTS

| | | |
|---|---|---|
| DE | 1 142 738 | 1/1963 |
| DE | 1 147 813 | 4/1963 |
| DE | 1 450 722 | 3/1969 |
| DE | 1 550 701 | 7/1969 |
| DE | 1 425 835 | 9/1969 |
| DE | 27 22 103 A1 | 12/1977 |
| DE | 32 08 944 A1 | 9/1983 |
| DE | 41 26 650 A1 | 10/1992 |
| DE | 198 51 895 A1 | 5/2000 |
| DE | 100 54 757 A1 | 5/2002 |
| GB | 2 008 208 A | 5/1979 |

* cited by examiner

SHIFTING ASSEMBLY FOR SHIFTING THE REVERSE GEAR OF A VARIABLE SPEED GEARWHEEL TRANSMISSION AND VARIABLE SPEED GEARWHEEL TRANSMISSION

This application is a National Stage completion of PCT/EP2009/065203 filed Nov. 16, 2009, which claims priority from German patent application serial no. 10 2008 054 665.8 filed Dec. 15, 2008.

FIELD OF THE INVENTION

The present invention concerns a shifting assembly for shifting the reverse gear of a variable-speed gearwheel, and a variable-speed gearwheel transmission with such a shifting assembly.

BACKGROUND OF THE INVENTION

For cost reasons and due to the restricted structural space available, until now manual-shift and semi-automatic variable-speed gearwheel transmissions have often been built and used without mechanical synchronization of the reverse gear. In such cases, however, under certain conditions when the reverse gear is engaged there occur unpleasant rattling noises and shift jerks. Besides, rattling when the reverse gear is engaged also causes increased wear of the gearwheels. Furthermore, when the transmission is hot the shifting time can be quite long.

To avoid these drawbacks a number of solutions have already been proposed. However, none of these solutions is optimal because they entail too much fitting space, high manufacturing cost or long shifting times. From DE 100 54 757 A1 a shifting assembly for the rapid and noise-free shifting of the reverse gear in a variable-speed gearwheel transmission is known, which takes up very little structural fitting space. In that document a shifting assembly with a reverse-gear gearwheel is described, with which are associated a synchronizer ring and a clutch body with a friction cone. The clutch body is connected in a rotationally fixed manner to a transmission shaft. The synchronizer ring is provided with an all-round groove in which a ring spring is set. An inner tooth array of the reverse-gear gearwheel is also provided with an all-round groove which, when the reverse gear is not engaged, is positioned opposite the groove in the synchronizer ring and in which the ring spring partially engages. To engage the reverse gear the spring force of the ring spring first has to be overcome, whereby a friction cone of the synchronizer ring is pressed against the friction cone of the clutch body so that synchronization between the rotational speeds of the gearwheel and the transmission shaft takes place. The spring force of the ring spring must be chosen appropriately large in order to ensure sufficient synchronization in any operating conditions and to prevent over-rapid shifting and rattling.

With this shifting assembly, to engage the reverse gear the spring force of the ring spring to be overcome must always be the same, regardless of operating conditions such as the temperature and thus regardless of whether the synchronization process is completed earlier or later. The result of this is that with a shifting assembly according to DE 100 54 757 A1 the shifting comfort under certain operating conditions is limited, either by a marked shifting resistance if the ring spring is strong, or by rattling noises if it is weaker.

SUMMARY OF THE INVENTION

Accordingly the purpose of the present invention is to provide a shifting assembly for trouble-free, comfortable shifting of the reverse gear in a variable-speed gearwheel transmission in any operating conditions, which takes up as little space as possible and ensures rattle-free shifting. In addition a corresponding variable-speed gearwheel transmission is indicated.

A shifting assembly for shifting the reverse gear of a variable-speed gearwheel transmission is proposed, which comprises a reverse-gear gearwheel mounted to rotate on a transmission shaft. The reverse-gear gearwheel has a first clutch tooth array. Associated with the reverse-gear gearwheel is a clutch body connected in a rotationally fixed manner to the transmission shaft, which has a second clutch tooth array. To engage the reverse gear, the first and second clutch tooth arrays are brought into engagement with one another, for example by being pushed into one another in the axial direction. Actively connected to the reverse-gear gearwheel is a synchronizer ring which has a friction surface that co-operates with a counterpart friction surface during the synchronization process.

According to the invention, the synchronizer ring and the reverse-gear gearwheel can be rotated relative to one another in the circumferential direction by a limited angular amount. In this case the synchronizer ring and the reverse-gear gearwheel can be rotated relative to one another between a blocking position and a through-connection position. In addition at least one stressing element is arranged between the synchronizer ring and the reverse-gear gearwheel, which pre-stresses the synchronizer ring relative to the reverse-gear gearwheel in the direction of the blocking position, whereby pushing of the two clutch tooth arrays into one another in the blocking position is prevented by positive interlock by means of at least one blocking element. In this way, when the reverse gear is not engaged the shifting assembly is always in the blocked position and over-rapid or inadvertent shifting into the reverse gear is effectively prevented.

Thus, the shifting assembly according to the invention has the advantages of a conventional synchronization system, which needs fewer components and takes up correspondingly less space. During the synchronization process, i.e. so long as the rotational speeds to be equalized are not yet equal, the stressing force acting on the stressing element and the friction force produced at the friction surfaces due to the speed difference add up to a locking force that holds the shifting assembly in the blocked position and thereby prevents a premature, damaging shift. Thus the acting locking forces are the force in the circumferential direction produced by the pre-stressed stressing element and the force in the circumferential direction produced by the synchronization process between the friction surface and the counterpart friction surface.

The synchronization process begins when, as the reverse gear is being engaged, the friction surface and its counterpart friction surface begin producing a torque, and is completed when at least approximately equal rotational speeds have been reached. After the completion of the synchronization process, i.e. when the speeds of the reverse-gear gearwheel and the clutch body are at least approximately the same, the blocked position can be released using a small shifting force since the stressing element and thus the at least one blocking element can be rotated relative to the reverse-gear gearwheel to a through-connection position. During this the pre-stressing force of the stressing element is overcome. In the through-connection position the first clutch tooth array on the reverse-gear gearwheel is brought into engagement with the second clutch tooth array on the clutch body, so that torque can be transmitted by the reverse-gear gearwheel to the transmission shaft. The pre-stressing force of the stressing element can be kept relatively small.

The first clutch tooth array on the reverse-gear gearwheel can either be made integrally with the gearwheel, or it can be formed on a clutch body that is connected in a rotationally fixed manner to the reverse-gear gearwheel.

In a first preferred design of the invention the counterpart friction surface that co-operates with the friction surface of the synchronizer ring is located on a forward-gear gearwheel adjacent to the reverse-gear gearwheel. This design involves particularly few components and enables the space taken up to be even smaller.

Since the reverse-gear gearwheel and the adjacent forward-gear gearwheel are necessarily coupled by the countershaft in opposite rotational directions, in this embodiment the common rotational speed can only be zero. As a rule, in variable-speed gearwheel transmissions the gearwheel for the first gear is arranged next to the reverse-gear gearwheel, and in this design it additionally serves as the counterpart friction surface.

According to a second preferred design, the counterpart friction surface is formed on a synchronizer element that is connected in a rotationally fixed manner to the transmission shaft. This synchronizer element can be formed as a separate ring or integrally with the clutch body, and has a conical counterpart friction surface.

A further preferred design provides that the at least one blocking element is in the form of a plurality of blocking bolts distributed uniformly around the circumference of the synchronizer ring. This blocking bolt synchronizer design enables a further optimized use of structural space, in particular also because when the reverse gear is engaged the blocking bolts are pushed into associated bores in the reverse-gear gearwheel.

The synchronizer ring can for example be connected to the reverse-gear gearwheel with positive interlock so that the synchronizer ring rotates together with the reverse-gear gearwheel around the transmission shaft. However, the interlocked connection between the synchronizer ring and the reverse-gear gearwheel allows at least as much play in the circumferential direction as is necessary to enable the two components to be rotated between the blocked position and the through-connection position. Here, the rotational axis corresponds to the central axis of the transmission shaft. According to a further preferred feature of the invention, the at least one cylindrical blocking bolt has at its free end a cylindrical drive-pin whose diameter is smaller than that of the rest of the blocking bolt and which projects into a bore associated with the drive-pin in the reverse-gear gearwheel.

Preferably, the transition between the larger diameter of the blocking bolt and the smaller diameter of the drive-pin is in the form of a conical blocking surface.

Another aspect of the invention concerns the stressing element that pre-stresses the synchronizer ring toward the reverse-gear gearwheel and holds it in the blocked position until the shift actuation force when the reverse gear is engaged after the synchronization process overcomes the stressing force and rotates the synchronizer ring with its blocking bolts relative to the reverse-gear gearwheel, into the through-connection position. The stressing element is preferably in the form of a perforated disk arranged to rotate on the reverse-gear gearwheel and having a through-hole for each of the blocking bolts. Preferably, the perforated disk is pre-stressed relative to the reverse-gear gearwheel by means of a spiral compression spring or a spiral tension spring.

To engage and disengage the reverse gear, the reverse-gear gearwheel is preferably pushed in the axial direction relative to the transmission shaft in order to bring the clutch tooth arrays respectively into or out of mutual engagement with one another. Compared with conventional synchronized shifting assemblies this saves a separate sliding sleeve and synchronizing body, and this above all substantially reduces the fitting space in the axial direction. It is also conceivable that instead of the reverse-gear gearwheel, it is the clutch body which is displaced axially in order to bring the clutch tooth arrays into engagement with one another.

Thanks to the, space-saving design features it is made possible for the clutch body, the synchronizer ring, the stressing element and the locking element to be arranged within the outer contour of the reverse-gear gearwheel and the forward-gear gearwheel adjacent to the reverse-gear gearwheel. This means that the proposed shifting assembly with synchronization of the reverse gear is actually of a form that is neutral as regards structural fitting space, i.e. compared with shifting assemblies with a non-synchronized reverse gear no additional fitting space is required. In a conventional synchronization unit with a synchronizer body and a sliding sleeve this is not possible, because the components require additional space particularly in the axial direction.

The invention also includes shifting assemblies with synchronization systems comprising double-cone or multiple-cone synchronizers known per se.

Finally, a variable-speed gearwheel transmission is claimed, which comprises a shifting assembly of the type described above.

BRIEF DESCRIPTION OF THE DRAWINGS

Example embodiments of the shifting assembly according to the invention are illustrated in the attached figures and described in more detail below. The figures show.

DETAILED DESCRIPTION OF THE PREFERRED EMBODIMENTS

Figure 1:
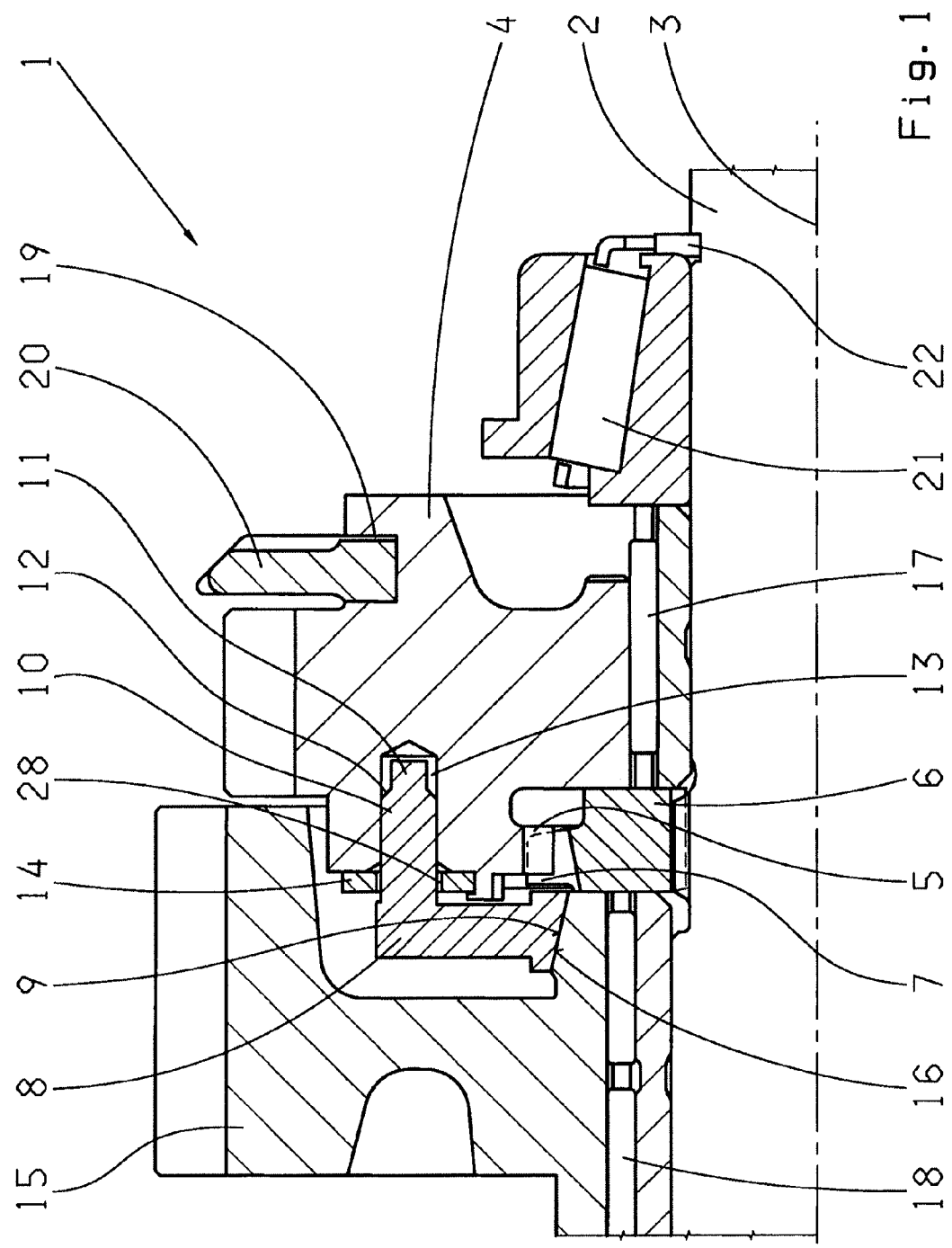
FIG. 1: Part of a first embodiment of the shifting assembly according to the invention, with the reverse gear engaged, represented as a schematic sectional view.

In the embodiment of the shifting assembly 1 according to the invention shown in FIG. 1, a reverse-gear gearwheel 4 is arranged so that it can rotate and move axially on a transmission shaft 2. The reverse-gear gearwheel rotates about the central axis 3 of the transmission shaft 2 and is mounted on the transmission shaft 2 by means of a roller bearing 17. In the area of the outer circumference of the reverse-gear gearwheel 4 it has a groove 19 in which the end of a shifting fork 20 engages. Next to the reverse-gear gearwheel 4 a forward-gear gearwheel 15 is also mounted via a roller bearing 18 to rotate about the central axis 3 of the transmission shaft 2.

On the side of the reverse-gear gearwheel 4 facing away from the forward-gear gearwheel 15 is arranged on the transmission shaft 2 a roller bearing 21 by means of which the transmission shaft 2 is mounted in a transmission housing (not shown). The transmission shaft 2 can be for example the drive input shaft of the transmission. The reverse-gear gearwheel 4 and the roller bearing 21 are supported in the axial direction relative to the transmission shaft 2 by a locking ring 22.

Between the reverse-gear gearwheel 4 and the forward-gear gearwheel 15, a clutch body 6 is attached in a rotationally fixed manner on the transmission shaft 2. It has a second clutch tooth array 7 on its outer circumference, which in the condition illustrated, is engaged with a first clutch tooth array 5 formed on the reverse-gear gearwheel 4.

Between the reverse-gear gearwheel 4 and the forward-gear gearwheel 15 there is also arranged a synchronizer ring 8 with a plurality of blocking bolts 10 distributed around the circumference of the synchronizer ring 8. In this example embodiment the blocking bolts 10 are made integrally with the synchronizer ring 8. Only one of the blocking bolts 10, can be seen in FIG. 1. In the engaged condition of the reverse gear, as illustrated, the blocking bolt 10 projects into a bore 13 in the reverse-gear gearwheel 4 associated with the blocking bolt 10. A drive-pin 11 is arranged at the free end of the blocking bolt 10. From its larger diameter, the blocking bolt 10 merges via a conical locking surface 12 down to the smaller diameter of the drive-pin 11.

In the area of its inside diameter, the synchronizer ring 8 has a conical friction surface 9 which, during the synchronization process, co-operates with a counterpart friction surface 16 opposite it. In this embodiment the counterpart friction surface 16 is arranged directly on the forward-gear gearwheel 15.

A stressing element 14 in the form of a perforated disk 14 is arranged between the reverse-gear gearwheel 4 and the forward-gear gearwheel 15. The perforated disk 14 has a through-hole 28, through which the blocking bolt 10 fixed on the synchronizer ring 8 projects into the bore 13 of the reverse-gear gearwheel 4.

Figure 2:
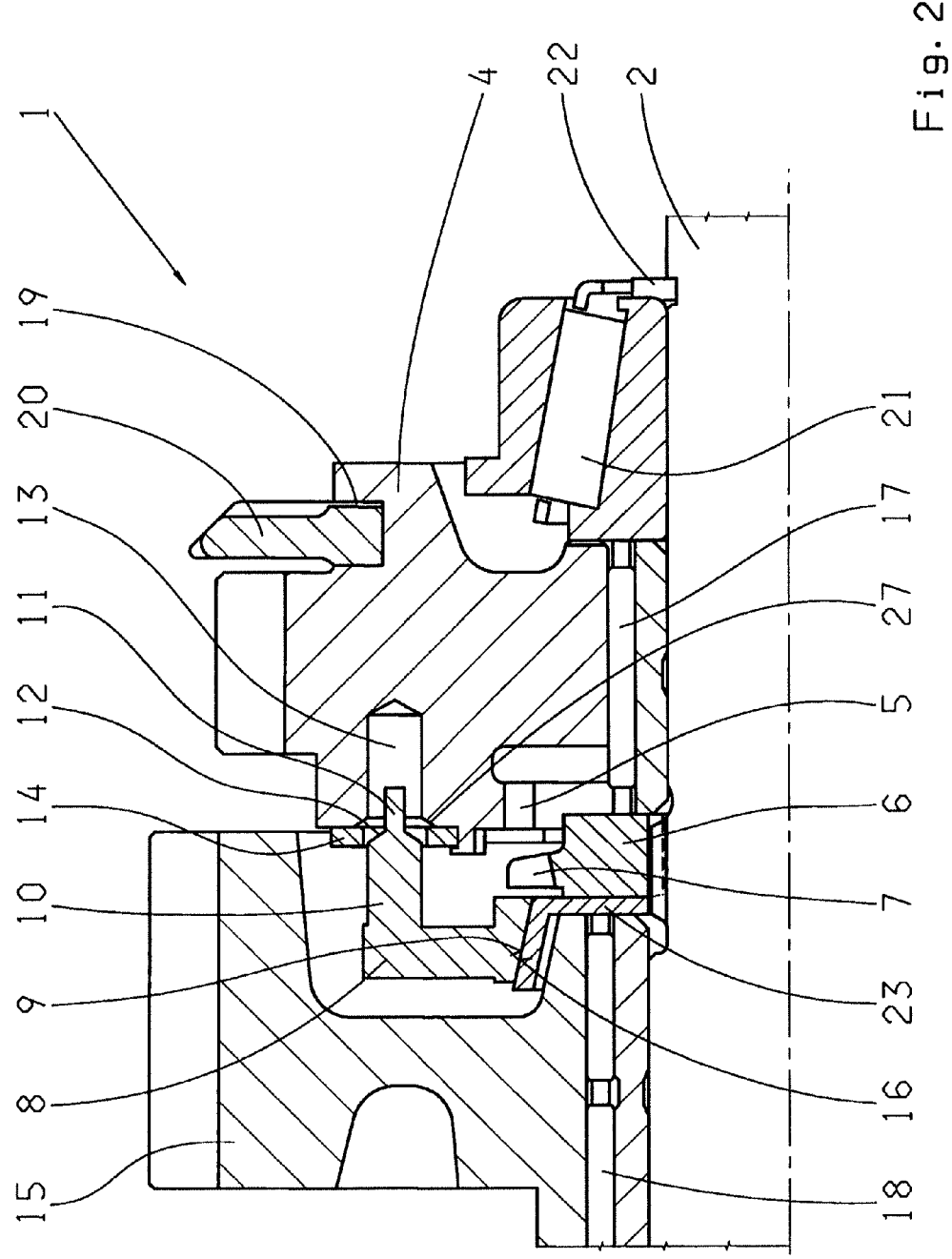
FIG. 2: Part of a second embodiment of the shifting assembly according to the invention, with the reverse gear disengaged, represented as a schematic sectional view.

FIG. 2 shows part of a second embodiment of the shifting assembly according to the invention, with the reverse gear disengaged. Since the second embodiment has a structure similar to that of the first embodiment shown in FIG. 1, the same indexes have been used for the same components and features in FIGS. 1 and 2.

The essential difference of the second embodiment in FIG. 2 compared to the first embodiment in FIG. 1 is that the counterpart friction surface 16 is not on the forward-gear gearwheel 15, but on a separate ring 23 arranged in a rotationally fixed manner on the transmission shaft 2 between the clutch body 6 and the forward-gear gearwheel 15. For this, the ring 23 has on its outer circumference a conical surface, which serves as the counterpart friction surface 16. As in the first embodiment described above, the friction surface 9 arranged on the synchronizer ring 8 co-operates with the counterpart friction surface 16.

FIG. 2 shows the shifting assembly in the disengaged condition of the reverse gear. Thus, the reverse-gear gearwheel 4 is in its position furthest removed from the adjacent forward-gear gearwheel 15 and is over the roller bearing 21. The first clutch tooth array 5 on the reverse-gear gearwheel 4 is not engaged with the second clutch tooth array 7 on the clutch body 6. Thus, in this condition there is no torque-transmitting connection between the reverse-gear gearwheel 4 and the transmission shaft 2. In this disengaged condition of the reverse gear, only the drive-pin 11 of the blocking bolt 10 projects into the bore 13 in the reverse-gear gearwheel 4. Since the drive-pin 11 has a smaller diameter than the bore 13, the synchronizer ring 8 made integrally with the blocking bolt 10 and drive-pin 11 is rotated by the pre-stressed stressing element 14 in the circumferential direction by a certain angular amount relative to the reverse-gear gearwheel 4. In this condition the shifting assembly 1 is in its blocked position.

Figure 3:
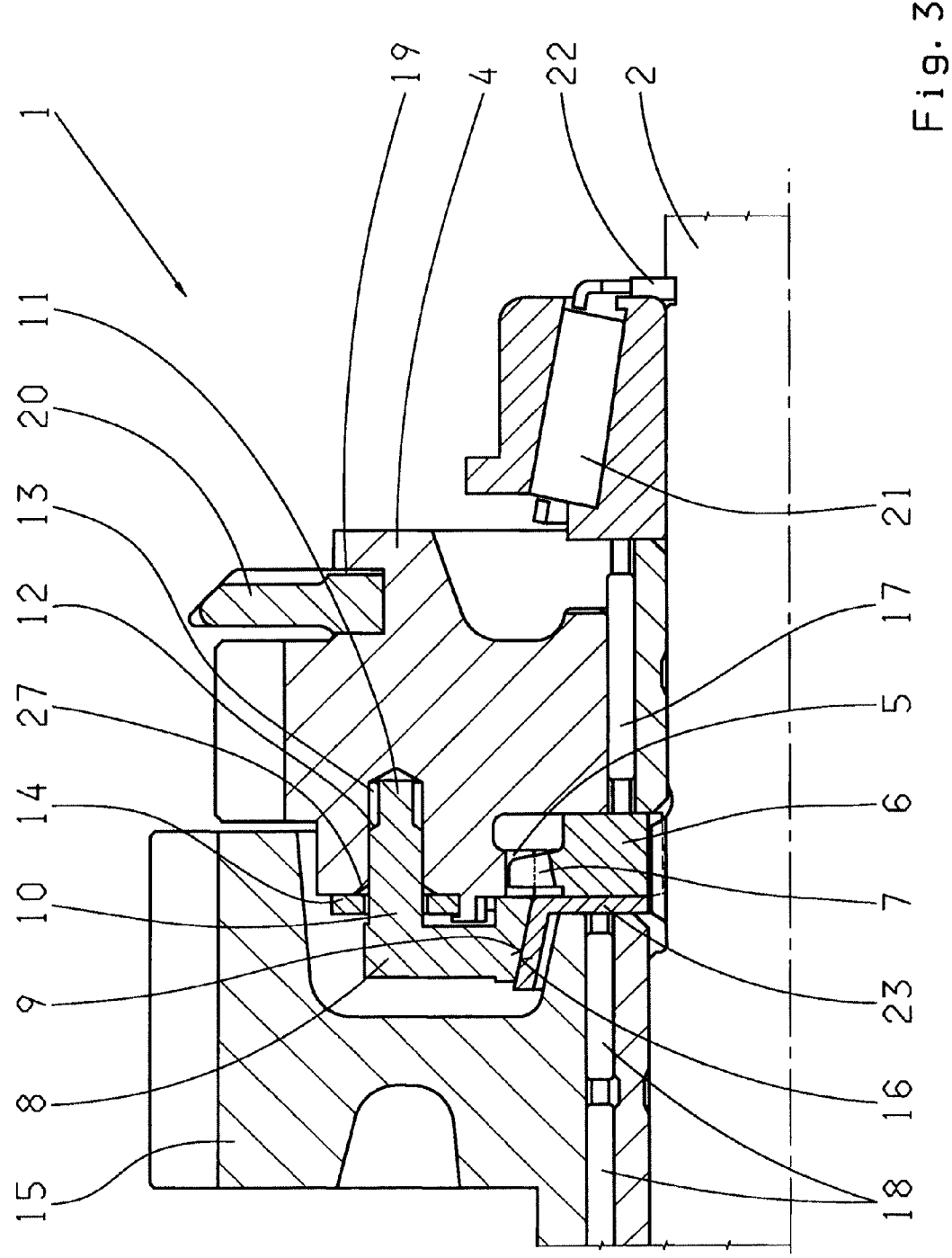
FIG. 3: Part of the second embodiment of the shifting assembly according to the invention, with the reverse gear engaged, represented as a schematic sectional view.

FIG. 3 shows the same embodiment as FIG. 2, but with the reverse gear engaged. In this case the reverse-gear gearwheel 4 has been pushed by the shifting fork 20 all the way to the left, so that the inside diameter of the reverse-gear gearwheel 4 is above the clutch body 6. The first and second clutch tooth arrays 5 and 7 are engaged in one another and there is a torque-transmitting connection between the reverse-gear gearwheel 4 and the transmission shaft 2. The blocking bolt 10 projects with its larger diameter as well into the bore 13 of the reverse-gear gearwheel 4. In this condition the shifting assembly 1 is in its through-connection position.

Figure 4:
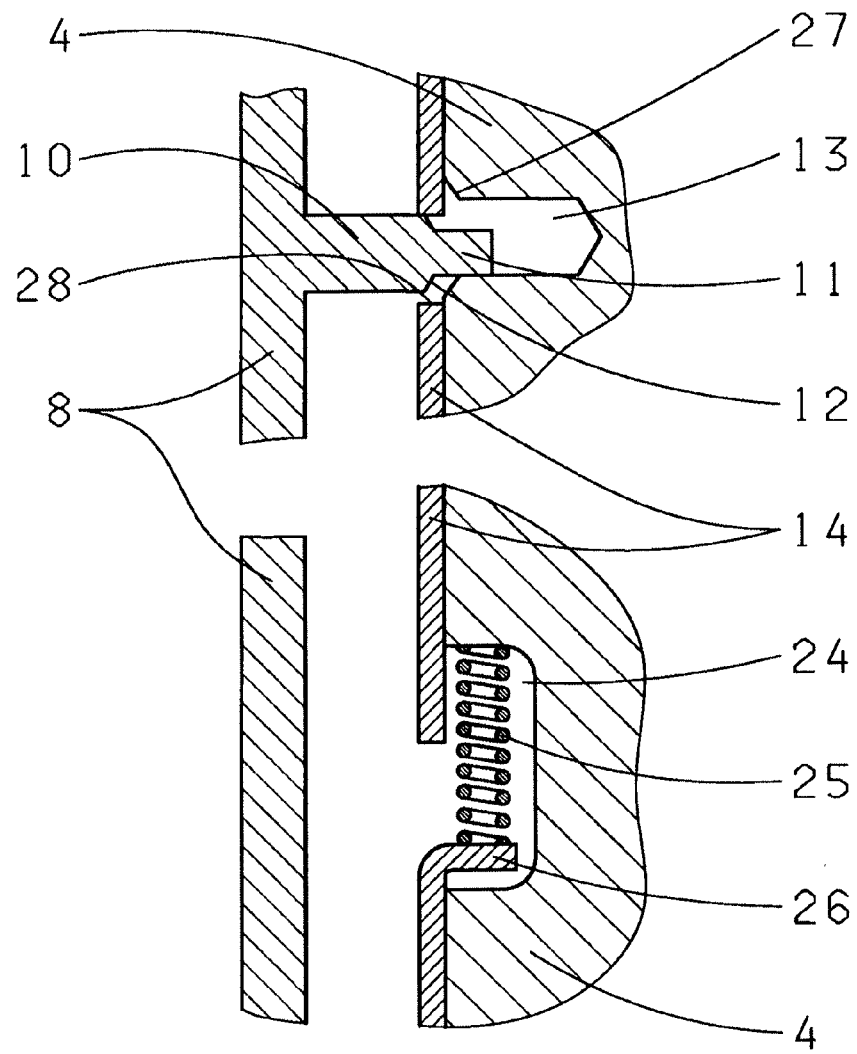
FIG. 4: Part of a shifting assembly according to the invention with a schematic sectional representation of the active connection between the reverse-gear gearwheel, a blocking element and the stressing element, with the reverse gear disengaged.
Figure 5:
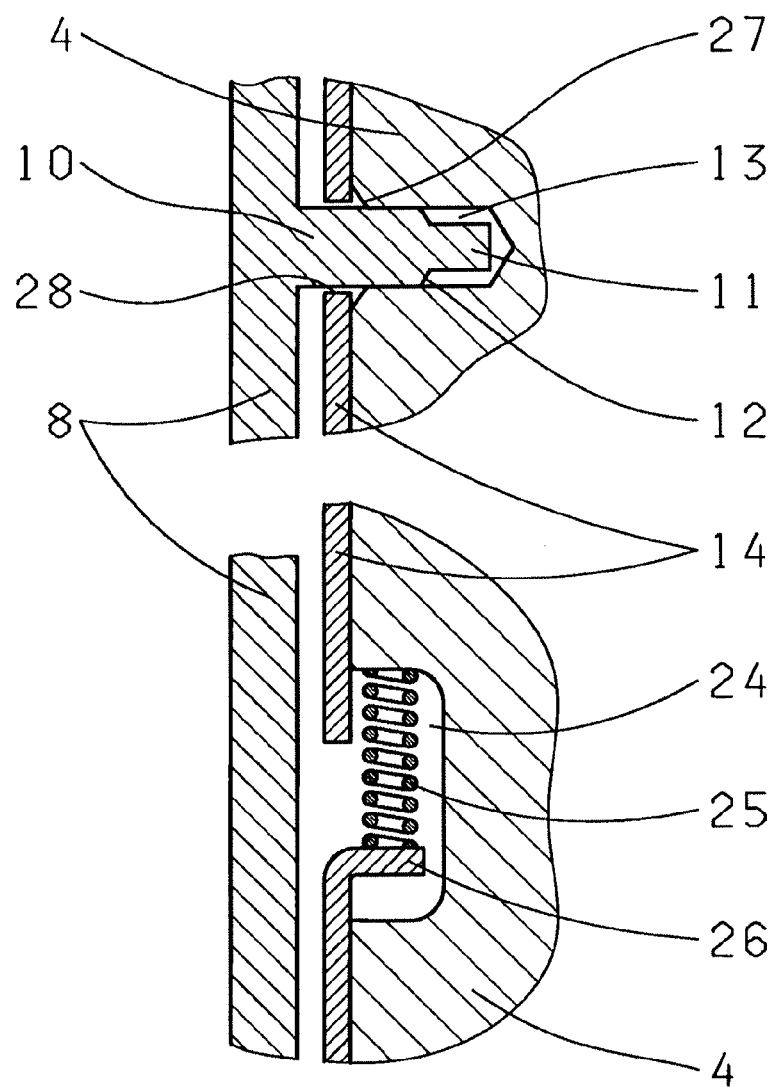
FIG. 5: Part of a shifting assembly according to the invention with a schematic sectional representation of the active connection between the reverse-gear gearwheel, a blocking element and the tensioning element, with the reverse gear engaged.

The association and positioning of the reverse-gear gearwheel 4, the blocking element 10 and the stressing element 14 with the reverse gear disengaged and engaged, are shown respectively in FIG. 4 and FIG. 5, which represent respectively a section with the blocking bolt 10 and a section with the interlocked connection between the tensioning element 14 and the reverse-gear gearwheel 4.

FIG. 4 shows the two sections when the reverse gear is in its disengaged and blocked position. The reverse-gear gearwheel 4 is in its position pushed all the way over to the right. Thereby, the blocking bolt 10 integrally connected to the synchronizer ring 8 is pulled far enough out of the bore 13 in the reverse-gear gearwheel 4 such that only the drive-pin 11 located on the free end of the blocking bolt 10 still projects into the bore 13. Since the drive-pin 11 has a smaller diameter than the bore 13, the synchronizer ring 8 with the blocking bolt 10 and drive-pin 11 are rotated by the stressing element 14 pre-stressed in the circumferential direction, relative to the reverse-gear gearwheel 4, far enough for the drive-pin 11 to rest against the inside surface of the bore 13. A through-going bore 28 in the stressing element 14, though which the blocking bolt 10 extends, is arranged offset relative to the bore 13 in the reverse-gear gearwheel 4 by a certain angular amount. In this blocked position an axial displacement of the reverse-gear gearwheel 4 in the direction toward the synchronizer ring 8 is prevented by the blocking surfaces 12 and 27 resting against one another.

The lower part of FIG. 4 shows a possible manner in which the pre-stress of the stressing element 14 can be applied on the reverse-gear gearwheel 4. For this, the reverse-gear gearwheel 4 has a recess 24 in its side surface facing toward the synchronizer ring 8 and the stressing element 14. On the stressing element 14 is formed a carrier-strip 26, which projects into the recess 24 and co-operates with a spiral compression spring 25 arranged in the recess 24. For this, the spiral compression spring 25 rests at one end against a side surface of the recess 24 and its other end presses against the carrier-strip 26 of the stressing element 14. The size of the pre-stressing force can be influenced as desired by using spiral compression springs 25 with various spring characteristics. In the design of the recess 24 and the selection of the spiral compression spring 25, care must be taken that the possible rotation angle between the stressing element 14 and the reverse-gear gearwheel 4 allows at least a rotation between the blocked position and the through-connection position.

FIG. 5 shows the same sections as FIG. 4, but with the reverse gear engaged in the through-connection position. The reverse-gear gearwheel 4 in this position is pushed all the way to the left. Consequently, the blocking bolt 10 integrally connected to the synchronizer ring 8 is pushed far enough into the bore 13 in the reverse-gear gearwheel 4 for the blocking bolt 10 to rest against the inside surface of the bore 13 in the area of its larger diameter. The through-going bore 28 in the stressing element 14 is then positioned approximately aligned with the bore 13 in the reverse-gear gearwheel 4.

The function of the shifting assembly according to the invention is described below with reference to a shifting sequence.

Before the reverse gear is engaged, the shifting assembly and its components are in the blocked position shown in FIG. 2. The clutch tooth arrays 5 and 7 are not engaged with one another because the reverse-gear gearwheel 4, which can move axially on the transmission shaft 2, is, in this position, pushed to the right. Consequently the blocking bolts 10 are pulled far enough out of the associated bores 13 in the reverse-gear gearwheel 4 such that only their respective drive-pins 11 still project into the bores 13. Due to the pre-stress on the stressing element 14, the synchronizer ring 8 with the blocking bolts 10 rotate far enough relative to the reverse-gear gearwheel 4, for the drive-pins 11 to rest against the inner circumference of the bores 13 and for the blocking surfaces 12 and 27 to be opposite one another.

To engage the reverse gear, the reverse-gear gearwheel 4 is pushed by the shifting fork 20 axially to the left over the transmission shaft 2. During this the blocking surfaces 12 and 27 come together after a first, short displacement movement. The shift actuation force in the axial direction is transferred via the blocking surfaces to the synchronizer ring 8 and the friction surface 9 is thus pressed against the counterpart friction surface 16 that is connected in a rotationally fixed manner to the transmission shaft 2. The friction force between the friction surface 9 and the counterpart friction surface 16 now ensures that any rotational speed differences existing between the transmission shaft 2 and the reverse-gear gearwheel 4 are equalized. During the synchronization process the friction force acts together with the stressing force of the spring 25 as a blocking force in the circumferential direction, in such manner that relative to the reverse-gear gearwheel 4 the synchronizer ring 8 is held in the blocked position. Only when the speeds of the transmission shaft 2 and the reverse-gear gearwheel 4 are at least approximately the same, do the friction force and thus the locking force in the circumferential direction decrease perceptibly and it becomes possible to overcome the locking force by the shift actuation force. For this, the reverse-gear gearwheel 4 is pushed further to the left so that the conical blocking surfaces 12 and 27 slide past over one another, whereby the stressing element 14 is rotated against the stressing force of the spring 25. During this, the reverse-gear gearwheel 4 is rotated relative to the synchronizer ring 8 and the transmission shaft 2 until the blocking bolts 10 can be pushed into the bores 13, so that at the same time the clutch tooth arrays 5 and 7 are brought into mutual engagement. Thereby, a torque-transmitting connection is formed by the reverse-gear gearwheel 4 and the transmission shaft 2.

In the embodiment according to FIG. 1, during the synchronization process the rotational speeds of the reverse-gear gearwheel 4 and the forward-gear gearwheel 15 for the first gear, arranged adjacent to it, are synchronized. Since the two gearwheels 4 and 15 are connected in a rotationally fixed manner to one another by a countershaft (not shown) but have different rotation directions, the common rotational speed of these gearwheels can always only be zero.

INDEXES

1 Shifting assembly
2 Transmission shaft
3 Central axis
4 Reverse-gear gearwheel
5 Clutch tooth array
6 Clutch body
7 Clutch tooth array
8 Synchronizer ring
9 Friction surface
10 Blocking bolt
11 Drive-pin
12 Blocking surface
13 Bore
14 Stressing element
15 Forward-gear gearwheel
16 Counterpart friction surface
17 Roller bearing
18 Roller bearing
19 Groove
20 Shifting fork
21 Roller bearing
22 Locking ring
23 Ring
24 Recess
25 Spiral compression spring
26 Carrier-strip
27 Blocking surface
28 Recess

The invention claimed is:

1. A shifting assembly (1) for shifting a reverse gear of a variable-speed gearwheel transmission, the shifting assembly comprising:
   a reverse-gear gearwheel (4) arranged to rotate on a transmission shaft (2) and having a first clutch tooth array (5);
   a clutch body (6) connected, in a rotationally fixed manner, to the transmission shaft (2) and the clutch body (6) having a second clutch tooth array (7) which is engageable with the first clutch tooth array (5) of the reverse-gear gearwheel (4);
   when engaging a reverse gear, the first and the second clutch tooth arrays (5, 7) being brought into engagement with one another;
   a synchronizer ring (8), supporting a friction surface (9), being associated with the reverse-gear gearwheel (4), and the friction surface (9) of the synchronizer ring (8) directly engaging with a counterpart friction surface (16) during a synchronization process, and the counterpart friction surface (16) being supported by one of a forward-gear gearwheel (15) or connected, in a rotationally fixed manner, to the transmission shaft (2);
   the synchronizer ring (8) and the reverse-gear gearwheel (4) being rotatable relative to one another, in a circumferential direction by a limited angular amount between a blocked position and a through-connection position;
   at least one stressing element (14) being located between the synchronizer ring (8) and the reverse-gear gearwheel (4) and being actively connected with the synchronizer ring (8) and the reverse-gear gearwheel (4) in such manner that the synchronizer ring (8) is pre-stressed relative to the reverse-gear gearwheel (4) in a direction of the blocked position; and
   in the blocked position, at least one blocking element (10) preventing the first and the second clutch tooth arrays (5, 7) from engaging with one another by positive interlock means.

2. The shifting assembly according to claim 1, wherein the counterpart friction surface (16) is supported on a forward-gear gearwheel (15) arranged adjacent to the reverse-gear gearwheel (4) and the friction surfaces (9, 16) being located radially closer to the transmission shaft (2) than the at least one blocking element (10).

3. The shifting assembly according to claim 1, wherein the at least one blocking element (10) comprises a plurality of blocking bolts (10) distributed around a circumference of the synchronizer ring (8).

4. The shifting assembly according to claim 1, wherein the reverse-gear gearwheel (4) is forced in an axial direction, relative to the transmission shaft (2), for engaging and disengaging the reverse gear.

5. The shifting assembly according to claim 1, wherein the clutch body (6), the synchronizer ring (23), the stressing element (14) and the blocking element (10) are arranged, at least in an engaged condition of the reverse gear, within an outer contour of the reverse-gear gearwheel (4) and a forward-gear gearwheel (15) adjacent to the reverse-gear gearwheel.

6. The shifting assembly according to claim 1, wherein the at least one stressing element (14) is prestressed in a circumferential direction relative to the reverse-gear gearwheel (4).

7. The shifting assembly according to claim 1, wherein the synchronizer ring (8) friction surface, associated with the reverse-gear gearwheel (4), is radially aligned with the first clutch tooth array (5).

8. The shifting assembly according to claim 1, wherein the at least one stressing element (14) moves axially with respect to the reverse-gear gearwheel (4), relative to both the clutch body (6) and the drive shaft (2), when engaging and disengaging the reverse gear.

9. The shifting assembly according to claim 1, wherein the clutch body (6) is fixed, in the axial direction, with respect to the drive shaft (2).

10. A shifting assembly (1) for shifting a reverse gear of a variable-speed gearwheel transmission, the shifting assembly comprising:
a reverse-gear gearwheel (4) arranged to rotate on a transmission shaft (2) and the reverse-gear gearwheel (4) having a first clutch tooth array (5);
a clutch body (6) connected, in a rotationally fixed manner, to the transmission shaft (2) and the clutch body (6) having a second clutch tooth array (7);
during engagement of a reverse gear, the first and the second clutch tooth arrays (5, 7) being brought into engagement with one another;
a synchronizer ring (8), having a friction surface, being associated with the reverse-gear gearwheel (4), and the synchronizer ring (8) co-operating with a counterpart friction surface (16) during a synchronization process;
the synchronizer ring (8) and the reverse-gear gearwheel (4) being rotatable relative to one another, in a circumferential direction by a limited angular amount, between a blocked position and a through-connection position;
at least one stressing element (14) being located between the synchronizer ring (8) and the reverse-gear gearwheel (4) and being actively connected with the synchronizer ring (8) and the reverse-gear gearwheel (4) in such manner that the synchronizer ring (8) is pre-stressed, in a direction of the blocked position, relative to the reverse-gear gearwheel (4);
in the blocked position, at least one blocking element (10) forming a positive interlock means for preventing the first and the second clutch tooth arrays (5, 7) from engaging with one another; and
the counterpart friction surface (16) is formed on a synchronizer element (23) connected, in a rotationally fixed manner, to the transmission shaft (2).

11. The shifting assembly according to claim 10, wherein the synchronizer element (23) is a ring with a conical counterpart friction surface (16).

12. The shifting assembly according to claim 10, wherein the synchronizer element (23) is formed integrally with the clutch body (6).

13. The shifting assembly according to claim 10, wherein the reverse-gear gearwheel (4) is moved, in an axial direction along the transmission shaft (2), when engaging and disengaging the reverse gear.

14. The shifting assembly according to claim 10, wherein the clutch body (6), the synchronizer ring (23), the stressing element (14) and the blocking element (10) are accommodate, at least in an engaged condition of the reverse gear, within an outer contour of the reverse-gear gearwheel (4) and a forward-gear gearwheel (15) adjacent to the reverse-gear gearwheel.

15. The shifting assembly according to claim 10, wherein the at least one blocking element (10) comprises a plurality of blocking bolts (10) distributed around a circumference of the synchronizer ring (8).

16. A shifting assembly (1) for shifting a reverse gear of a variable-speed gearwheel transmission, the shifting assembly comprising:
a reverse-gear gearwheel (4) arranged to rotate on a transmission shaft (2) and having a first clutch tooth array (5);
a clutch body (6) connected in a rotationally fixed manner to the transmission shaft (2) and having a second clutch tooth array (7) which is engageable associated with the first clutch tooth array (5) of the reverse-gear gearwheel (4);
during engagement of a reverse gear, the first and the second clutch tooth arrays (5, 7) being brought into engagement with one another;
a synchronizer ring (8) having a friction surface being associated with the reverse-gear gearwheel (4), and the synchronizer ring (8) co-operating with a counterpart friction surface (16) during a synchronization process;
the synchronizer ring (8) and the reverse-gear gearwheel (4) being rotatable relative to one another, in a circumferential direction by a limited angular amount, between a blocked position and a through-connection position;
at least one stressing element (14) being located between the synchronizer ring (8) and the reverse-gear gearwheel (4) and being actively connected with the synchronizer ring (8) and the reverse-gear gearwheel (4) in such manner that the synchronizer ring (8) is pre-stressed relative to the reverse-gear gearwheel (4) in a direction of the blocked position;
in the blocked position, at least one blocking element (10) preventing the first and the second clutch tooth arrays (5, 7) from engaging with one another by positive interlock means;
the at least one blocking element (10) comprises a plurality of cylindrical blocking bolts (10) distributed around a circumference of the synchronizer ring (8);
at least one of the plurality of cylindrical blocking bolts (10) has a cylindrical drive-pin (11), at a free end thereof; and
and the cylindrical drive-pin (11) having a smaller diameter than a remainder of the blocking bolt (10) projecting into a bore (13) in the reverse-gear gearwheel (4) associated with the drive-pin (11).

17. The shifting assembly according to claim 16, wherein a conical blocking surface (12) has a transition from a larger diameter of the cylindrical blocking bolt (10) into the smaller diameter of the cylindrical drive-pin (11).

18. The shifting assembly according to claim 16, wherein the stressing element (14) is a perforated disk which is arranged to rotate on the reverse-gear gearwheel (4) and which has an associated through-hole (28) for each one of the plurality of cylindrical blocking bolts (10).

19. The shifting assembly according to claim 18, wherein the perforated disk (14) is pre-stressed, relative to the reverse-gear gearwheel (4), by one of a spiral compression spring and a spiral tension spring.

20. The shifting assembly according to claim 16, wherein the counterpart friction surface (16) is located on a forward-gear gearwheel (15) arranged adjacent to the reverse-gear gearwheel (4).

\* \* \* \* \*